United States Patent
Sone (10) Patent No.: US 10,059,367 B2
(45) Date of Patent: Aug. 28, 2018

(54) ELECTRIC POWER STEERING DEVICE AND ELECTRIC POWER STEERING SYSTEM

(71) Applicant: TOYOTA JIDOSHA KABUSHIKI KAISHA, Toyota-shi, Aichi-ken (JP)

(72) Inventor: Atsushi Sone, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 15/320,940

(22) PCT Filed: Jul. 9, 2015

(86) PCT No.: PCT/IB2015/001147
§ 371 (c)(1),
(2) Date: Dec. 21, 2016

(87) PCT Pub. No.: WO2016/005808
PCT Pub. Date: Jan. 14, 2016

(65) Prior Publication Data
US 2017/0129534 A1    May 11, 2017

(30) Foreign Application Priority Data
Jul. 10, 2014    (JP) .................. 2014-141875

(51) Int. Cl.
*B62D 5/04* (2006.01)
*B62D 6/10* (2006.01)

(52) U.S. Cl.
CPC ......... *B62D 5/0463* (2013.01); *B62D 5/0412* (2013.01); *B62D 6/10* (2013.01)

(58) Field of Classification Search
CPC ....... B62D 5/0463; B62D 6/10; B62D 5/0412
See application file for complete search history.

(56) References Cited

U.S. PATENT DOCUMENTS

| | | |
|---|---|---|
| 2009/0200098 A1 | 8/2009 | Inoue et al. |
| 2009/0292454 A1 | 11/2009 | Nakai |
| 2010/0044146 A1 | 2/2010 | Kasai et al. |

FOREIGN PATENT DOCUMENTS

| | | |
|---|---|---|
| EP | 2127997 A2 | 12/2009 |
| EP | 2377744 A1 | 10/2011 |
| JP | 2000-198457 A | 7/2000 |
| JP | 2005-193751 A | 7/2005 |
| JP | 2007-112319 A | 5/2007 |
| JP | 2009-208760 A | 9/2009 |
| JP | 2009-280162 A | 12/2009 |

*Primary Examiner* — Michael D Lang
(74) *Attorney, Agent, or Firm* — Oliff PLC (57) ABSTRACT

A characteristic selection/current upper limit value calculation section 64 selects a cranking upper limit characteristic map MP2 in the case where a cranking state is detected by a cranking state supposition section 63, and selects a non-cranking upper limit characteristic map MP1 in the case where the cranking state is not detected. Upper limit limitation on a current caused to pass through a motor 20 is relaxed in a cranking upper limit characteristic as compared with a non-cranking upper limit characteristic. Consequently, it is possible to prevent excessive current limitation during cranking.

8 Claims, 6 Drawing Sheets

ELECTRIC POWER STEERING DEVICE AND ELECTRIC POWER STEERING SYSTEM

BACKGROUND OF THE INVENTION

1. Field of the Invention

The invention relates to an electric power steering device an electric power steering system that drive a motor based on a steering operation of a driver to generate a steering assist torque.

2. Description of Related Art

There is an electric power steering device that controls an energization amount of a motor in accordance with a steering torque applied to a steering wheel by a driver to generate a steering assist torque. In such an electric power steering device, in the case where the driver performs a steering operation strongly, a large current flows from a vehicle-mounted power supply to the motor. When the vehicle-mounted power supply is degraded, an output voltage (power supply voltage) of the vehicle-mounted power supply decreases during energization of the motor. As the degree of degradation of the vehicle-mounted power supply is larger, the decrease of the power supply voltage to the current flowing to a load from the vehicle-mounted power supply becomes more significant. A control unit (referred to as an ECU) for controlling the motor includes electronic control components such as a microcomputer, a sensor, and the like. Accordingly, power supply within a specified voltage is required and, since the power is supplied from the vehicle-mounted power supply shared by the motor, it is necessary to suppress the decrease of the voltage of the vehicle-mounted power supply.

To cope with this, a technique for limiting steering assist in the case where the power supply voltage decreases is proposed conventionally. For example, Japanese Patent Application Publication No. 2005-193751 (JP 2005-193751 A) proposes a technique in which a current upper limit value as the upper limit value of the current caused to pass through the motor is decreased in the case where the power supply voltage decreases during the steering assist, and the current upper limit value is gradually returned to a normal value in the case where the power supply voltage recovers.

Figure 8:
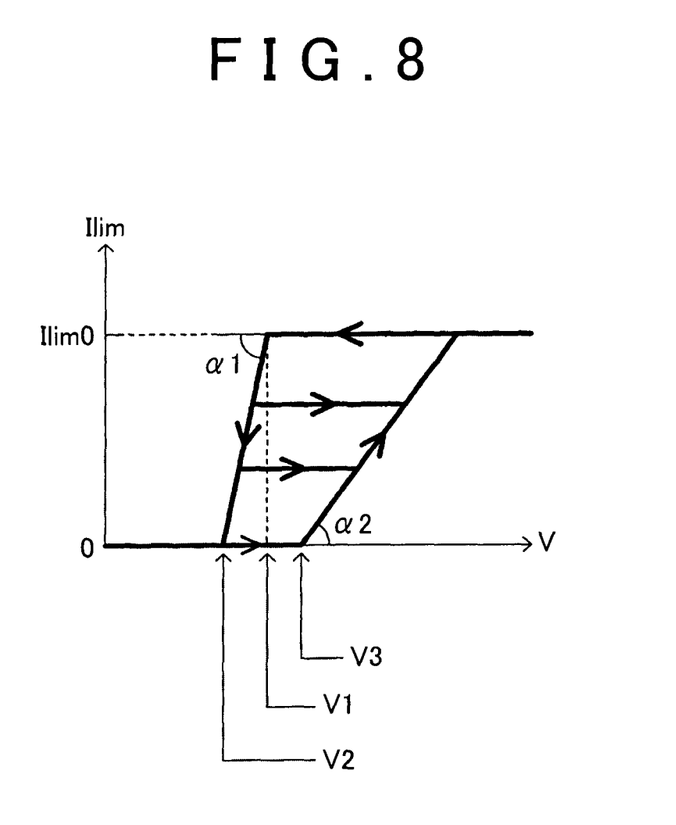
FIG. 8 is a graph showing a basic upper limit characteristic.

In the electric power steering device, basically, in the case where the steering assist is limited using the current upper limit value, the ECU calculates a current upper limit value Ilim according to, e.g., an upper limit characteristic shown in FIG. 8 in which a power supply voltage V is associated with the current upper limit value Ilim, and controls the energization of the motor within the range of the current upper limit value Ilim. Hysteresis is provided in the upper limit characteristic, and the relationship between the power supply voltage V and the current upper limit value Ilim in the case where the power supply voltage decreases is different from the relationship therebetween in the case where the power supply voltage increases. Specifically, when the power supply voltage V decreases and becomes lower than a decrease start voltage V1, the current upper limit value Ilim is set so as to decrease from a basic current upper limit value Ilim0 with a gradient α1 in response to the decrease of the power supply voltage V. In the case where the power supply voltage V becomes lower than a assist prohibition voltage V2, the current upper limit value Ilim is set to zero.

In the case where the power supply voltage V starts to increase, the current upper limit value Ilim is set so as to increase with a gradient α2 in response to the increase of the power supply voltage V after an increase amount of the power supply voltage V exceeds a hysteresis amount. For example, in the case where the power supply voltage V becomes lower than the assist prohibition voltage V2 and then starts to increase, the current upper limit value Ilim is maintained at zero until the power supply voltage V exceeds an increase start voltage V3 (>V2), and the current upper limit value Ilim is set so as to increase in response to the increase of the power supply voltage V after the power supply voltage V exceeds the increase start voltage V3.

The upper limit characteristic needs to be set such that upper limit limitation of the current (hereinafter referred to as current limitation) can be performed appropriately on constant factors for reduction of a power supply ability such as the degradation of the vehicle-mounted power supply. For example, the power supply ability is reduced in the case where an in-vehicle battery is degraded, and hence, when the current limitation is weakened (the current upper limit value is increased) immediately after the power supply voltage starts to increase due to the current limitation, a hunting phenomenon in which the power supply voltage decreases and the current limitation is intensified again occurs due to its reaction. In response to this, the steering assist torque fluctuates, and a steering operation feeling deteriorates. To cope with this, the hysteresis is set in the upper limit characteristic. In addition, it is necessary to set a gentle gradient as the gradient α2 such that a driver does not operate a steering wheel excessively with a sudden increase of the steering assist.

By executing the current limitation by using the upper limit characteristic set in the manner described above, even in the case where the vehicle-mounted power supply is degraded, it is possible to maintain the power supply voltage of the vehicle-mounted power supply within a specified range as much as possible.

SUMMARY OF THE INVENTION

The electric power steering device is configured such that the steering assist can be obtained only during operation of an engine. In the case where a control system is configured such that steering assist control is continued even during the stop of the engine, there are cases where the steering assist is limited by the above current limitation resulting from the decrease of the power supply voltage during cranking. This is because an alternator does not generate power during cranking so that the power supply ability of the vehicle-mounted power supply is low, and a starter motor is started so that the power supply voltage decreases at the moment of start of the starter motor.

The decrease of the power supply voltage during cranking lasts for an extremely short period of time (e.g., about 100 milliseconds), and the power supply voltage recovers shortly. As a result, when the upper limit characteristic that is strictly set as described above is used without any alteration and the current limitation is executed, a time period when the steering assist is limited, i.e., a time period when the operation feeling of the steering wheel is heavy is prolonged unnecessarily so that it becomes impossible to perform the current limitation suitable during cranking.

The invention provides an electric power steering device and system allowing appropriate current limitation during cranking.

An electric power steering system according to a first aspect of the invention includes steering torque detection means for detecting a steering torque input by a driver; a motor that generates a steering assist torque; motor control means for controlling energization of the motor in accordance with the steering torque detected by the steering torque detection means; power supply voltage detection means for detecting a power supply voltage as an output voltage of the vehicle-mounted power supply; current upper limit value setting means for decreasing a current upper limit value in response to a decrease of the power supply voltage and increasing the current upper limit value in response to an increase of the power supply voltage in a case where the power supply voltage starts to increase after the current upper limit value is decreased, the current upper limit value setting means includes: cranking state detection means for detecting a cranking state in which it is supposed that an engine is in a situation where the engine is cranked; and upper limit characteristic selection means for selecting a non-cranking upper limit characteristic, as the current upper limit value, in which the current upper limit value is set based on the power supply voltage when the cranking state is not detected, and selecting a cranking upper limit characteristic, as the current upper limit value, in which the current upper limit value is set based on the power supply voltage such that the upper limit limitation on the current caused to pass through the motor is relaxed as compared with the non-cranking upper limit characteristic when the cranking state is detected, and current limitation means for imposing the upper limit limitation on the current caused to pass through the motor such that the current caused to pass through the motor is not more than the current upper limit value selected by the upper limit characteristic selection means.

An electric power steering system according to a second aspects of the invention includes a steering torque detection unit that detects a steering torque applied to a steering wheel; a motor that generates a steering assist torque; and an electric control unit that controls energization of the motor in accordance with the steering torque detected by the steering torque detection unit, detects a power supply voltage as an output voltage of a vehicle-mounted power supply, decreases a current upper limit value in response to a decrease of the power supply voltage, increases the current upper limit value in response to an increase of the power supply voltage in a case where the power supply voltage starts to increase after the current upper limit value is decreased, detects a cranking state in which it is supposed that an engine is in a situation where the engine is cranked, selects a non-cranking upper limit characteristic, as the current upper limit value, in which the current upper limit value is set based on the power supply voltage when the cranking state is not detected, selects a cranking upper limit characteristic, as the current upper limit value, in which the current upper limit value is set based on the power supply voltage such that the upper limit limitation on the current caused to pass through the motor is relaxed as compared with the non-cranking upper limit characteristic when the cranking state is detected, and imposes the upper limit limitation on the current caused to pass through the motor such that the current caused to pass through the motor is not more than the current upper limit value.

In the above aspects, the motor control means controls, the energization of the motor in accordance with the steering torque, and the steering assist torque corresponding to the steering torque input by the driver is thereby generated. The current caused to pass through the motor is limited so as to be not more than the current upper limit value by the current limitation means. The current upper limit value is set by the current upper limit value setting means. Based on the power supply voltage, the current upper limit value setting means decreases the current upper limit value in response to the decrease of the power supply voltage and, in the case where the power supply voltage starts to increase after the current upper limit value is decreased, the current upper limit value setting means increases the current upper limit value in response to the increase of the power supply voltage. Consequently, even in the case where the power supply voltage decreases due to the operation of the motor, it is possible to suppress the decrease of the power supply voltage by limiting the current caused to pass through the motor.

In the case where the electric power steering device is configured to be able to generate the steering assist torque during stop of the engine, there are cases where the engine is cranked during steering assist. In these cases, there are cases where the power supply voltage decreases due to the cranking, and the current upper limit value is decreased. However, the decrease of the power supply voltage caused by the cranking lasts for an extremely short time period, and the power supply voltage recovers shortly. On the other hand, in the case where the decrease of the power supply voltage is detected when the cranking is not performed, there is a high possibility that the vehicle-mounted power supply is degraded. Consequently, when the same current limitation corresponding to the power supply voltage is performed in a situation where the cranking occurs and in a situation where the cranking does not occur, the current limitation during cranking is likely to be excessive. To cope with this, in the above aspects, the current upper limit setting means includes the cranking state detection means and the upper limit characteristic selection means in order to perform the current limitations having characteristics suitable during cranking and suitable during non-cranking.

The cranking state detection means detects the cranking state in which it is supposed that the engine is in the situation where the engine is cranked. For example, it is possible to detect the cranking state by inputting a switch signal indicative of a state of an operation switch that issues an instruction to start/stop the engine. In this case, there is a high possibility that the engine is restarted when the switch signal indicative of the instruction to stop the engine is input during running of a vehicle, and hence it may be determined that the cranking state is established. Alternatively, when the engine is stopped during the running of the vehicle and, thereafter, the switch signal indicative of the instruction to restart the engine is input, it may be determined that the cranking state is established. In addition, for example, the cranking state may be detected by inputting information indicative of start of a cranking operation from an engine control device that controls the operation of the engine.

The upper limit characteristic selection means selects the non-cranking upper limit characteristic in which the current upper limit value is set based on the power supply voltage when the cranking state is not detected, and selects the cranking upper limit characteristic in which the current upper limit value is set based on the power supply voltage such that the upper limit limitation on the current caused to pass through the motor is relaxed as compared with the non-cranking upper limit characteristic when the cranking state is detected. The current limitation means imposes the upper limit limitation on the current caused to pass through the motor by using the non-cranking upper limit characteristic or the cranking upper limit characteristic selected by the upper limit characteristic selection means.

In the cranking upper limit characteristic, the upper limit limitation on the current caused to pass through the motor is relaxed as compared with the non-cranking upper limit characteristic. Consequently, it is possible to prevent excessive current limitation during cranking. As a result, according to the above aspects, it is possible to appropriately perform the current limitation during cranking and the current limitation during non-cranking. With this, it is possible to improve a steering operation feeling while suppressing the decrease of the voltage of the vehicle-mounted power supply. It should be noted that the description "the current upper limit value is set based on the power supply voltage" is not limited to a configuration in which the current upper limit value is set based on the power supply voltage itself (including the history of the power supply voltage), but may include a configuration in which the current upper limit value is set based on, e.g., the power supply voltage and a change rate (a differential value) of the power supply voltage.

In the above aspects, the cranking upper limit characteristic may be set such that the current upper limit value corresponding to the power supply voltage during a time period when the current upper limit value is increased is maintained at a value higher than the value in the non-cranking upper limit characteristic, and the upper limit limitation on the current is thereby relaxed. In this case, the cranking upper limit characteristic may be set such that an increase start voltage representing the power supply voltage when the increase of the current upper limit value is started after the power supply voltage starts to increase is lower than the increase start voltage in the non-cranking upper limit characteristic, and the upper limit limitation on the current may thereby be relaxed.

As described above, in the case where the power supply voltage starts to increase after the current upper limit value is decreased, the current upper limit value setting means increases the current upper limit value in response to the increase of the power supply voltage. As the current upper limit value corresponding to the power supply voltage during the time period when the current voltage upper limit value is increased is higher, the current limitation is relaxed more significantly. In addition, as the increase start voltage representing the power supply voltage when the increase of the current upper limit value is started is lower, the current limitation is relaxed at an earlier timing.

Consequently, according to the above aspects, in the case where the temporary decrease of the power supply voltage during cranking occurs, it is possible to lift the current limitation earlier than during non-cranking. With this, it is possible to shorten a time period when the steering assist is limited by the current limitation (a time period when the steering assist is limited). Consequently, it is possible to effectively use the steering assist.

On the other hand, in the case where the decrease of the power supply voltage occurs during non-cranking, there is a high possibility that the vehicle-mounted power supply is degraded. In this case, by setting the current upper limit value corresponding to the power supply voltage to a low value, it is possible to suppress the decrease of the power supply voltage, and reduce the possibility of occurrence of a hunting phenomenon caused by lifting the current limitation.

In the above aspects, the cranking upper limit characteristic may be set such that an increase rate at which the current upper limit value is increased in response to the increase of the power supply voltage after the power supply voltage starts to increase is larger than the increase rate in the non-cranking upper limit characteristic, and the upper limit limitation on the current is thereby relaxed.

As described above, in the case where the power supply voltage starts to increase after the current upper limit value is decreased, the current upper limit value setting means increases the current upper limit value in response to the increase of the power supply voltage. The current upper limit value is increased in response to the increase of the power supply voltage more quickly as the increase rate at which the current upper limit value is increase is larger, and the current upper limit value is increased in response to the increase of the power supply voltage more slowly as the increase rate is smaller. With this, it is possible to relax the current limitation by increasing the increase rate.

Consequently, according to the above aspects, in the case where the temporary decrease of the power supply voltage occurs during cranking, it is possible to relax the current limitation at a high speed with the recovery of the power supply voltage and, as a result, it is possible to lift the current limitation early. With this, it is possible to shorten a time period when the operation feeling of a steering wheel is heavy.

In the case where the decrease of the power supply voltage is detected during non-cranking, there is a high possibility that the vehicle-mounted power supply is degraded. In the case where the vehicle-mounted power supply is degraded, the operation feeling of the steering wheel becomes heavy due to the current limitation. On the other hand, when the increase rate at which the current upper limit value is increased is large, the operation feeling of the steering wheel suddenly becomes light and the steering wheel may be operated excessively. To cope with this, in the aspects, the increase rate is set to be small during non-cranking, and the current limitation is slowly lifted. Accordingly, it is possible to prevent a driver from operating the steering wheel excessively. In addition, it is possible to reduce the possibility of occurrence of the hunting phenomenon caused by lifting the current limitation.

In the above aspects, the cranking upper limit characteristic may be set such that the current upper limit value corresponding to the power supply voltage during a time period when the current upper limit value is decreased is maintained at a value higher than the value in the non-cranking upper limit characteristic, and the upper limit limitation on the current is thereby relaxed. In this case, the cranking upper limit characteristic may be set such that a decrease start voltage representing the power supply voltage when the decrease of the current upper limit value is started in response to the decrease of the power supply voltage is lower than the decrease start voltage in the non-cranking upper limit characteristic, and the upper limit limitation on the current may thereby be relaxed.

As described above, the current upper limit value setting means decreases the current upper limit value in response to the decrease of the power supply voltage. As the current upper limit value corresponding to the power supply voltage during the time period when the current upper limit value is decreased is higher, the current limitation is relaxed more significantly. In addition, as the decrease start voltage representing the power supply voltage when the decrease of the current upper limit value is started is lower, the timing at which the current limitation is started is later, and the current limitation is relaxed.

Consequently, according to the aspects, it is possible to prevent a decrease operation of the current upper limit value from being performed unnecessarily during cranking. That is, it is possible to reduce the frequency of limitation of the steering assist by the current limitation. With this, it is possible to effectively use the steering assist. On the other hand, in the case where the decrease of the power supply voltage occurs during non-cranking, there is a high possibility that the vehicle-mounted power supply is degraded. In this case, the current upper limit value corresponding to the power supply voltage is set to a low value, and hence it is possible to reliably limit the current caused to pass through the motor. With this, it is possible to suppress the decrease of the power supply voltage excellently.

In the above aspects, the cranking upper limit characteristic may be set such that a decrease rate at which the current upper limit value is decreased in response to the decrease of the power supply voltage is smaller than the decrease rate in the non-cranking upper limit characteristic, and the upper limit limitation on the current is thereby relaxed.

As described above, the current upper limit value setting means decreases the current upper limit value in response to the decrease of the power supply voltage. As the decrease rate at which the current upper limit value is decreased is smaller, the current upper limit value is decreased in response to the decrease of the power supply voltage more slowly. Conversely, as the decrease rate is larger, the current upper limit value is decreased in response to the decrease of the power supply voltage more quickly. Consequently, it is possible to relax the current limitation by reducing the decrease rate.

Consequently, according to the aspects, in the case where the temporary decrease of the power supply voltage occurs during cranking, it is possible to decrease the current upper limit value in response to the decrease of the power supply voltage slowly. With this, it is possible to prevent sudden change of the steering operation feeling. On the other hand, in the case where the decrease of the power supply voltage occurs during non-cranking, there is a high possibility that the vehicle-mounted power supply is degraded. In the case, it is possible to suppress the decrease of the power supply voltage excellently by decreasing the current upper limit value in response to the decrease of the power supply voltage quickly.

In the above aspects, the same current upper limit value corresponding to the power supply voltage in a case where the current upper limit value is decreased in response to the decrease of the power supply voltage may be set in each of the cranking upper limit characteristic and the non-cranking upper limit characteristic.

According to the aspects, similarly to the case during non-cranking, it is possible to impose the strict current limitation under a situation where the power supply voltage is decreasing even during cranking. Consequently, it is possible to prevent excessive drop of the power supply voltage. In addition, the current limitation is relaxed as compared with the current limitation during non-cranking after the power supply voltage starts to increase, and hence it is possible to shorten the time period when the steering assist is limited by the current limitation. It should be noted that, with regard to the description "the same current upper limit value is set in each of the cranking upper limit characteristic and the non-cranking upper limit characteristic", the current upper limit value in the cranking upper limit characteristic may be the same as the current upper limit value in the non-cranking upper limit characteristic, and the matching of the current upper limit values is not limited to perfect matching.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
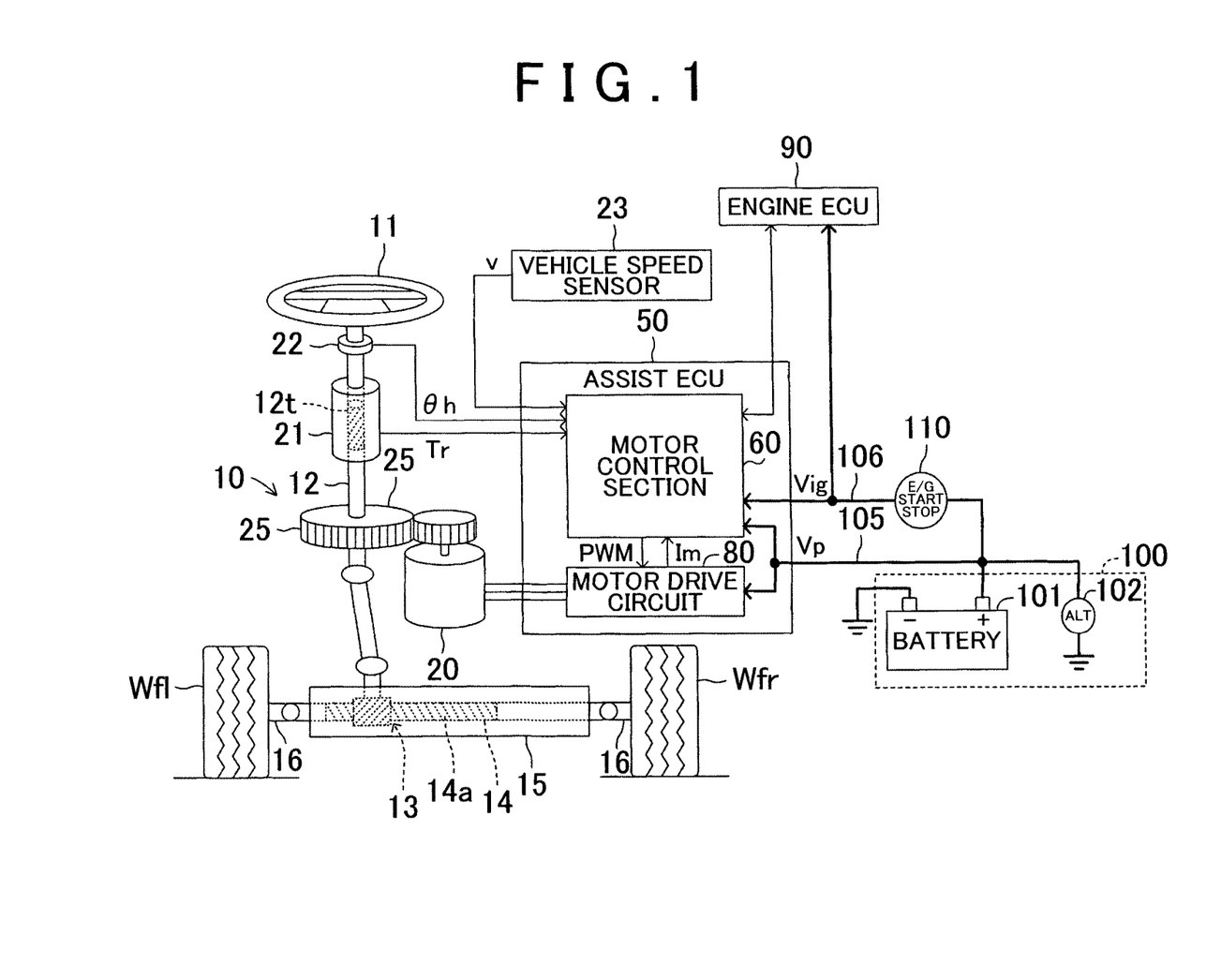
FIG. 1 is a schematic configuration diagram of an electric power steering device according to an embodiment of the invention.

Hereinbelow, an electric power steering device according to an embodiment of the invention will be described by using the drawings. FIG. 1 shows the schematic configuration of the electric power steering device of a vehicle as the embodiment.

The electric power steering device includes a steering mechanism 10 that turns a turning wheel by a steering operation of a steering wheel 11, a motor 20 that generates a steering assist torque, and an ECU 50 that controls the operation of the motor 20. Hereinafter, the ECU 50 is referred to as an assist ECU 50.

The steering mechanism 10 is configured so as to convert rotation of a steering shaft 12 about an axis that is interlocked with the rotation operation of the steering wheel 11 to a stroke motion of a rack bar 14 in a left and right direction using a rack and pinion mechanism 13, and turn a left front wheel Wfl and a right front wheel Wfr with the stroke motion.

A gear section 14a of the rack bar 14 is accommodated in a rack housing 15 and both end portions on the left and the right of the gear section 14a are exposed from the rack housing 15 and coupled to tie rods 16. The other ends of the tie rods 16 on the left and the right are connected to steering knuckles (not shown) provided in the left and right front wheels Wfl and Wfr.

The motor 20 is mounted to the steering shaft 12 via a final reduction gear 25. As the motor 20, for example, a three-phase brushless motor is used. The motor 20 rotationally drives the steering shaft 12 about its center axis with rotation of a rotor, and applies an assist torque to the rotation operation of the steering wheel 11.

In the steering shaft 12, a torque sensor 21 is provided between the steering wheel 11 and the final reduction gear 25. The torque sensor 21 detects a torsional force exerted on a torsion bar 12t provided in the steering shaft 12 as a steering torque Tr applied to the steering wheel 11, and outputs a detection signal indicative of the steering torque Tr. It should be noted that, with regard to the steering torque Tr, the direction in which the steering torque Tr is exerted is indicated by a sign, and it is assumed that the torque exerted on the steering shaft 12 in a right rotation direction is indicated by, e.g., a positive value, and the torque exerted on the steering shaft 12 in a left rotation direction is indicated by, e.g., a negative value. In the case where the magnitude of the steering torque Tr is discussed, the absolute value is used.

In the steering shaft 12, a steering angle sensor 22 is provided between the torsion bar 12*t* and the steering wheel. The steering angle sensor 22 detects a rotation angle of the torsion bar 12*t* as a steering angle θh of the steering wheel 11, and outputs a detection signal indicative of the steering angle θh.

Next, the assist ECU 50 will be described. The assist ECU 50 includes a motor control section 60 that calculates a control amount of the motor 20, and a motor drive circuit 80 that drives the motor 20 in accordance with a pulse-width modulation (PWM) control signal output from the motor control section 60.

The motor control section 60 includes a microcomputer, an input/output interface, a power supply circuit, and a nonvolatile memory. To the motor control section 60, the torque sensor 21, the steering angle sensor 22, and a vehicle speed sensor 23 that detects a vehicle speed and outputs a detection signal indicative of a vehicle speed v are connected. In addition, the motor control section 60 is connected to an engine control device 90 (hereinafter referred to as an engine ECU 90) such that the motor control section 60 and the engine ECU 90 can communicate with each other. The motor control section 60 calculates a target assist current Ias* used to energize the motor 20, and outputs a PWM control signal generated such that the target assist current Ias* passes through the motor 20 to the motor drive circuit 80.

The motor drive circuit 80 is, e.g., a three-phase inverter circuit, the PWM control signal output from the motor control section 60 is input, and a duty ratio of a switching element is controlled using the PWM control signal. In the motor drive circuit 80, a current sensor 24 (see FIG. 2) that detects the current flowing in each phase is provided. The current sensor 24 outputs a detection signal corresponding to the detected current value (hereinafter referred to as a motor current Im) to the motor control section 60. It should be noted that, in the present embodiment, the three-phase brushless motor is used as the motor, but the motor is not limited to the three-phase brushless motor, and it is also possible to use, e.g., a single-phase brush motor or the like. In the case where the three-phase brushless motor is used, although it is necessary to provide a motor rotation angle sensor to detect a motor electrical angle and control the phase based on the motor electrical angle, the description thereof is omitted.

To the assist ECU 50, power is supplied from a power supply device 100 as a vehicle-mounted power supply. The power supply device 100 is configured by connecting a battery 101 having a rated output voltage of 12 V in parallel with an alternator 102 that generates power with the rotation of the engine, and supplies power not only to the assist ECU 50 but also to electric loads in the vehicle.

Power is supplied to the assist ECU 50 from the power supply device 100 via power supply lines of two systems (a first power supply line 105 and a second power supply line 106). The first power supply line 105 directly connects the assist ECU 50 and the power supply device 100.

On the other hand, the second power supply line 106 connects the assist ECU 50 and the power supply device 100 via an engine start switch 110. The engine start switch 110 is an operation switch with which start and stop of the engine are requested by a driver, and the engine start switch 110 outputs voltage signals not only to the assist ECU 50 but also to the engine ECU 90 and the other in-vehicle electronic control device (hereinafter referred to as an in-vehicle ECU). The engine start switch 110 outputs the voltage signal (analog signal) indicative of the power supply voltage of the power supply device 100 in response to a push operation of the driver. The engine start switch 110 outputs the voltage signal indicative of the power supply voltage when the engine start switch 110 is pushed during stop of the engine, and stops the output of the voltage signal when the engine start switch 110 is pushed during operation of the engine. The engine ECU 90 starts the engine when the voltage signal is output from the engine start switch 110, and stops the engine when the output of the voltage signal is stopped. Consequently, the engine start switch 110 corresponds to an ignition switch.

It should be noted that the assist ECU 50 includes a power supply relay (not shown) that interrupts power supplied from the first power supply line 105, and the assist ECU 50 is configured such that the power supply into the assist ECU 50 can be interrupted by turning OFF the power supply relay. The voltage signal output from the engine start switch 110 can also be used as a control system power supply for operating the motor control section 60. As a result, even in a situation where the power supply relay is turned OFF, it is possible to activate the microcomputer of the motor control section 60 using the voltage signal output from the engine start switch 110, and turn ON the power supply relay to start steering assist control.

In addition, with the combination with other operation states by the driver (e.g., a brake pedal operation state), the engine start switch 110 can be caused to function not only as the ignition switch but also as an accessory switch, but such a function is not related to the invention directly, and hence the description thereof will be omitted.

Hereinafter, the voltage directly supplied to the assist ECU 50 from the power supply device 100 is referred to as a power supply voltage Vp, and the voltage supplied to the assist ECU 50 via the engine start switch 110 is referred to as an IG voltage Vig. Each of the power supply voltage Vp and the IG voltage Vig represents the output voltage of the power supply device 100.

The motor control section 60 is activated when the IG voltage Vig is supplied from the engine start switch 110 in a state in which the steering assist control is stopped, and executes an initial diagnosis in the assist ECU 50. The motor control section 60 starts the steering assist control in the case where the diagnosis result satisfies an activation permission condition.

Figure 2:
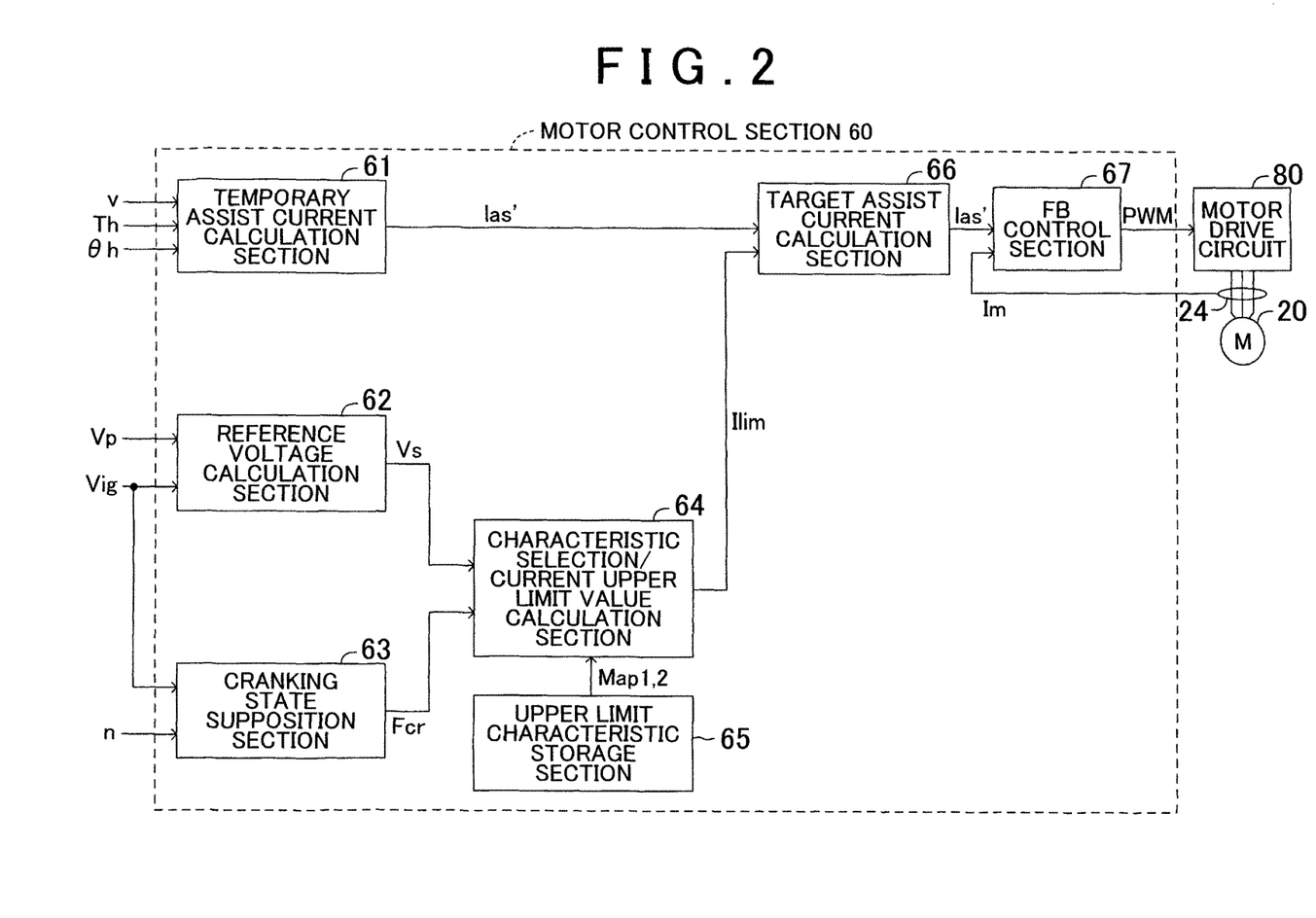
FIG. 2 is a functional block diagram of a motor control section.

Next, a steering assist control process performed by the motor control section 60 will be described. FIG. 2 is a functional block diagram related to the steering assist control of the motor control section 60. The motor control section 60 includes a temporary assist current calculation section 61, a reference voltage calculation section 62, a cranking state supposition section 63, a characteristic selection/current upper limit value calculation section 64, an upper limit characteristic storage section 65, a target assist current calculation section 66, and a feedback control section 67. Each functional section repeatedly executes arithmetic processing shown below at a predetermined short interval.

The temporary assist current calculation section 61 reads the steering torque Tr detected by the torque sensor 21, the steering angle θh detected by the steering angle sensor 22, and the vehicle speed v detected by the vehicle speed sensor 23. Subsequently, the temporary assist current calculation section 61 calculates a temporary assist current Ias' as a temporary target assist current based on the three detection values. The temporary assist current Ias' is a target assist current before the current limitation is imposed using a current upper limit value described later.

In the calculation, the temporary assist current calculation section 61 calculates a basic assist torque that is set according to the input vehicle speed v and steering torque Tr. The basic assist torque is set so as to increase in response to an increase of the steering torque Tr and have a larger value as the vehicle speed v is lower. In addition, the temporary assist current calculation section 61 calculates a compensation torque that compensates the basic assist torque based on the steering angle θh or a steering angle speed ωh obtained by differentiating the steering angle θh with respect to time. For example, the temporary assist current calculation section 61 calculates a return compensation torque that returns the steering wheel 11 to a neutral position and a friction viscosity compensation torque that imparts appropriate friction and viscosity feelings to the steering wheel 11. The return compensation torque is calculated based on the steering angle θh, and the friction viscosity compensation torque is calculated based on the steering angle speed ωh.

The temporary assist current calculation section 61 calculates a target assist torque Tas* by adding the compensation torque to the basic assist torque, and calculates the temporary assist current Ias' by dividing the target assist torque Tas* by a torque constant. The temporary assist current calculation section 61 supplies the calculated temporary assist current Ias' to the target assist current calculation section 66.

The reference voltage calculation section 62 detects the power supply voltage Vp and the IG voltage Vig, and sets the higher one of the power supply voltage Vp and the IG voltage Vig as a reference voltage Vs. The reference voltage Vs is considered to represent the power supply voltage of the power supply device 100, and is handled as the voltage serving as the reference for calculation of a current upper limit value Ilim. The detection of the power supply voltage is not limited thereto, and the power supply voltage may be detected at any position in the power supply line. It should be noted that the reference voltage calculation section 62 calculates the reference voltage Vs by performing low-pass filter processing on the higher one of the power supply voltage Vp and the IG voltage Vig. The reference voltage calculation section 62 supplies the calculated reference voltage Vs to the characteristic selection/current upper limit value calculation section 64.

The cranking state supposition section 63 is a functional section that determines whether or not the cranking state is established. The cranking state is a state in which it is supposed that the engine is in a situation where the engine is cranked (a situation where the engine will be probably cranked shortly and/or a situation where the engine is actually being cranked). As described above, when the engine start switch 110 is turned ON and the IG voltage Vig is supplied, the motor control section 60 starts the steering assist control after the execution of the initial diagnosis. After the start of the steering assist control, the motor control section 60 ends the steering assist control in the case where the engine start switch 110 is turned OFF in the state in which the vehicle stops, but does not end the steering assist control even when the engine start switch 110 is turned OFF in the case where the vehicle is running. That is, when the engine start switch 110 is turned OFF, the motor control section 60 determines whether or not the vehicle speed v is zero (v=0), and ends the assist control in the case where the vehicle speed v is zero and does not end the assist control in the case where the vehicle speed v is not zero.

For example, a situation where a driver switches a shift lever from a drive position to a neutral position during running of the vehicle on a downward slope and turns OFF the engine start switch 110 is conceivable. In this case, the engine is stopped, but the steering assist control is not ended. Thus, the situation where the steering assist control is operated during the stop of the engine is present.

Figure 3:
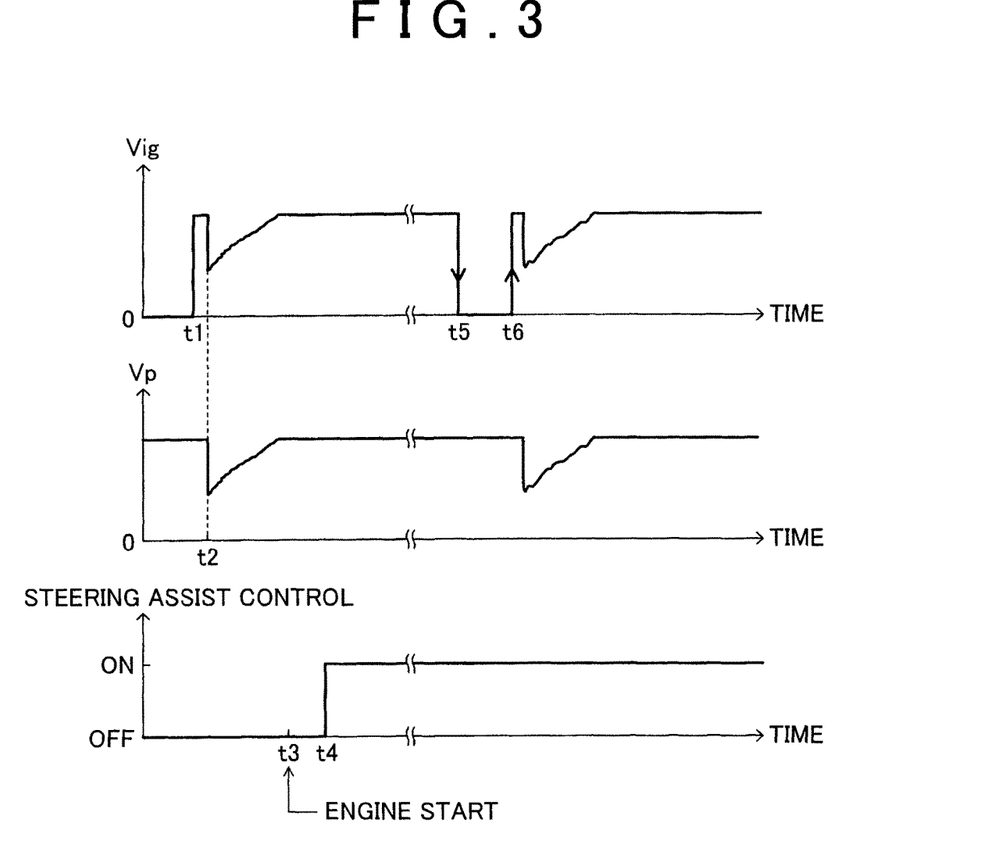
FIG. 3 is a graph showing a relationship among an IG voltage, a power supply voltage, and an operation state of steering assist control.

A lower graph in FIG. 3 represents the operation/stop state of the steering assist control. In FIG. 3, a time period indicated by ON represents an operation time period of the steering assist control, and a time period indicated by OFF represents a stop time period of the steering assist control. When the engine start switch 110 is turned ON at time t1, the IG voltage Vig increases up to a voltage equal to the output voltage of the power supply device 100. The engine ECU 90 operates a starter motor that is not shown based on the increase of the IG voltage Vig. With this, at time t2, the engine is cranked. The power supply voltage Vp and the IG voltage Vig temporarily decrease during cranking. The engine is started at time t3, and the steering assist control is activated at time t4.

At time t5 when the engine start switch 110 is turned OFF during running of the vehicle, the IG voltage Vig decreases to 0 volts and the engine is stopped by the engine ECU 90. However, the vehicle speed v is not zero, and hence the operation of the steering assist control is continued. In this situation, there is a high possibility that the engine start switch 110 is turned ON by the driver, i.e., the engine is restarted.

Accordingly, the cranking state supposition section 63 determines whether or not the engine start switch 110 is turned OFF during the steering assist control, i.e., the IG voltage Vig decreases to a voltage not more than a predetermined voltage Vigref, and determines that the cranking state (the state in which it is supposed that the engine is in the situation where the engine is cranked) is established when the IG voltage Vig has decreased to the voltage not more than the predetermined voltage Vigref. The predetermined voltage Vigref may be appropriately set to a voltage that allows detection of turning OFF of the engine start switch 110. The cranking state supposition section 63 supplies a flag Fcr as a signal indicative of the result of the determination of whether or not the cranking state is established to the characteristic selection/current upper limit value calculation section 64. For example, the flag Fcr is set to "1" in the case where it is determined that the cranking state is established, and is set to "0" in the case where it is determined that the cranking state is not established.

After the cranking state supposition section 63 has determined that the cranking state is established, the cranking state supposition section 63 maintains the determination result until the start of the engine is confirmed. For example, the cranking state supposition section 63 maintains the determination result that the cranking state is established until the cranking state supposition section 63 acquires rotation speed information indicative of an engine rotation speed n from the engine ECU 90 and confirms that the engine rotation speed n exceeds a specific rotation speed. In addition, the cranking state supposition section 63 determines that the cranking state is not established in the case where the IG voltage Vig does not decrease to the value not more than the predetermined voltage Vigref.

To the characteristic selection/current upper limit value calculation section 64, the reference voltage Vs supplied from the reference voltage calculation section 62 and the flag Fcr supplied from the cranking state supposition section 63 are input. The characteristic selection/current upper limit value calculation section 64 selects an upper limit characteristic map identified by the flag Fcr from upper limit characteristic maps MP1 and MP2 stored in the upper limit characteristic storage section 65, and calculates the current upper limit value Ilim corresponding to the reference voltage Vs by referring to the selected upper limit characteristic map. The upper limit characteristic map is data in which the relationship between the reference voltage Vs and the current upper limit value Ilim as the upper limit value of the current caused to pass through the motor 20 is set. Hereinafter, the relationship between the reference voltage Vs and the current upper limit value Ilim is referred to as an upper limit characteristic.

Figure 4:
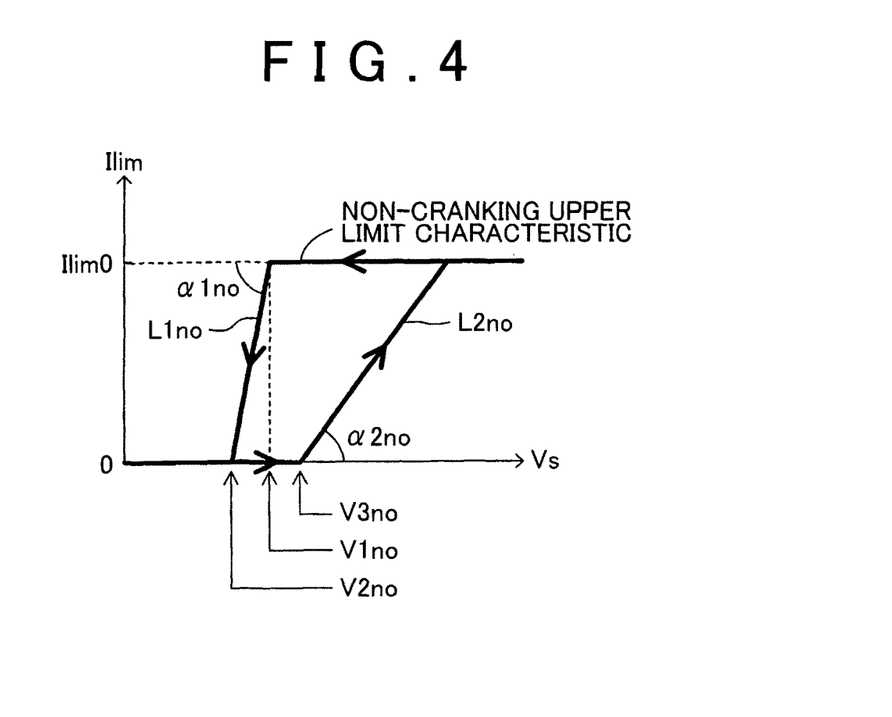
FIG. 4 is a graph showing a non-cranking upper limit characteristic.
Figure 5:
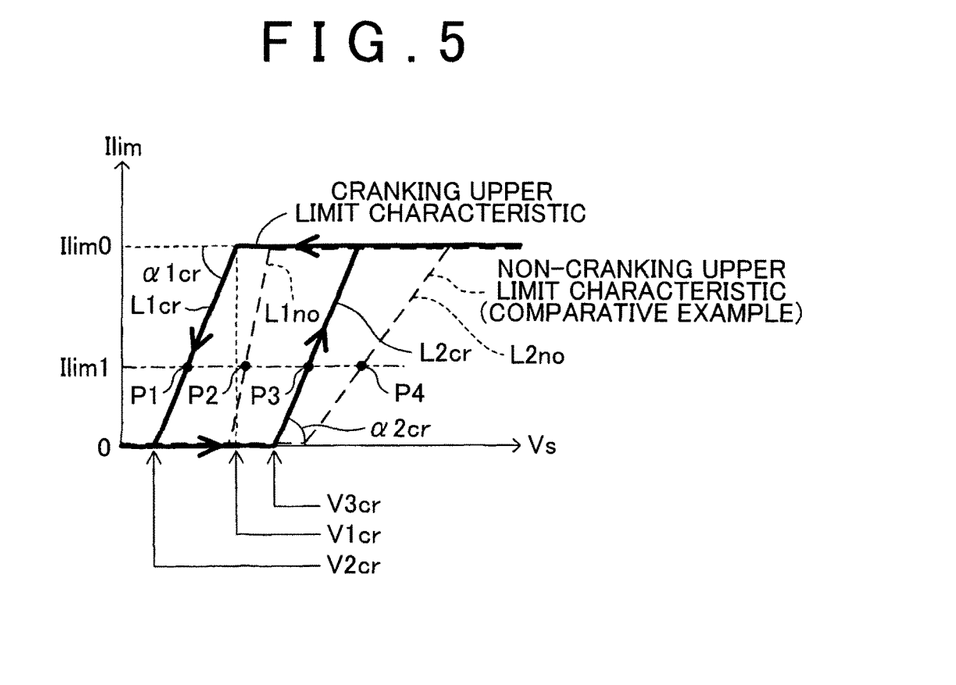
FIG. 5 is a graph showing a cranking upper limit characteristic.

The upper limit characteristic storage section 65 stores a non-cranking upper limit characteristic map MP1 and a cranking upper limit characteristic map MP2 as the upper limit characteristic map. FIG. 4 shows a non-cranking upper limit characteristic set by the non-cranking upper limit characteristic map MP 1. FIG. 5 shows a cranking upper limit characteristic set by the cranking upper limit characteristic map MP2. A broken line in FIG. 5 indicates the non-cranking upper limit characteristic for comparison. The cranking upper limit characteristic is set such limitation on the current caused to pass through the motor 20 is relaxed as compared with the non-cranking upper limit characteristic, as described later. It should be noted that the upper limit characteristic is not limited to the upper limit characteristic stored as the map, the upper limit characteristic may be any data as long as the relationship between the reference voltage Vs and the current upper limit value Ilim is set in the data, and the upper limit characteristic may be stored as, e.g., a function.

The characteristic selection/current upper limit value calculation section 64 selects the non-cranking upper limit characteristic map MP1 in a situation where the flag Fcr is set to "0", i.e., it is determined that the cranking state is not established, and selects the cranking upper limit characteristic map MP2 in a situation where the flag Fcr is set to "1", i.e., it is determined that the cranking state is established.

Hysteresis is provided in the upper limit characteristic, and the current upper limit value Ilim is determined based on the direction of change of the reference voltage Vs. Accordingly, the characteristic selection/current upper limit value calculation section 64 stores the change of the reference voltage Vs continuously, and calculates the current upper limit value Ilim in the case where the reference voltage Vs increases that is different from the current upper limit value Ilim calculated in the case where the reference voltage Vs decreases. The upper limit characteristic will be described in detail later.

The characteristic selection/current upper limit value calculation section 64 calculates the current upper limit value Ilim corresponding to the reference voltage Vs by referring to the upper limit characteristic map, and then supplies the current upper limit value Ilim to the target assist current calculation section 66.

To the target assist current calculation section 66, the temporary assist current Ias' supplied from the temporary assist current calculation section 61 and the current upper limit value Ilim supplied from the characteristic selection/current upper limit value calculation section 64 are input. The target assist current calculation section 66 determines whether or not the temporary assist current Ias' is larger than the current upper limit value Ilim, and sets the current upper limit value Ilim as the target assist current Ias* in the case where the temporary assist current Ias' is larger than the current upper limit value Ilim (Ias*←Ilim). Consequently, the target assist current Ias* with which the steering assist is limited using the current upper limit value Ilim is calculated. It should be noted that the control amount of the current caused to pass through the motor 20 is handled by using the signs (positive/negative) for determining the direction of generation of the torque, and the upper limit limitation on the current limits the absolute value. Consequently, in the case where the absolute value of the temporary assist current Ias' is larger than the current upper limit value Ilim, the absolute value of the target assist current Ias* is set to the current upper limit value Ilim, and the sign is not changed.

On the other hand, in the case where the temporary assist current Ias' is not more than the current upper limit value Ilim, the target assist current calculation section 66 sets the temporary assist current Ias' as the target assist current Ias* (Ias*←Ias'). Consequently, the target assist current Ias* with which the steering assist is not limited is calculated. The target assist current calculation section 66 supplies the calculated target assist current Ias* to the feedback control section 67.

The feedback control section 67 reads the motor current Im passing through the motor 20 from the current sensor 24, calculates a deviation ΔI (Ias*−Im) between the motor current Im and the target assist current Ias*, and drives the motor 20 using feedback control (e.g., proportional-integral (PI) control) based on the deviation ΔI.

When the feedback control section 67 drives the motor 20, the feedback control section 67 calculates a target command voltage V* corresponding to the deviation ΔI, outputs the PWM control signal corresponding to the target command voltage V* to the motor drive circuit 80, and thereby drives the motor 20.

The individual functional sections repeat the above arithmetic processing to execute the steering assist control process, and the motor control section 60 thereby drives the motor 20. With this, the steering assist torque corresponding to the steering operation by the driver and limited according to the reference voltage Vs is obtained. In the case where the vehicle speed is zero and the engine start switch 110 is turned OFF, the motor control section 60 ends the steering assist control.

Herein, a difference between the cranking upper limit characteristic and the non-cranking upper limit characteristic will be described. As shown in FIG. 4, in the non-cranking upper limit characteristic, the relationship between the reference voltage Vs and the current upper limit value Ilim is set by using a decrease line L1no and a recovery line L2no. The decrease line L1no is used in the setting of the current upper limit value Ilim when the reference voltage Vs changes in a decrease direction, and the recovery line L2no is used in the setting of the current upper limit value Ilim when the reference voltage Vs changes in an increase direction. A voltage width between the decrease line L1no and the recovery line L2no is obtained as a result of setting the hysteresis. Consequently, even when the reference voltage Vs starts to increase from its decrease state, the current upper limit value Ilim is maintained at a specific value and is not increased while the reference voltage Vs does not increase to a voltage defined by the recovery line L2no.

As indicated by a solid line in FIG. 5, in the cranking upper limit characteristic, the relationship between the reference voltage Vs and the current upper limit value Ilim is set by using a decrease line L1cr and a recovery line L2cr. The decrease line L1cr is used in the setting of the current upper limit value Ilim when the reference voltage Vs changes in the decrease direction, and the recovery line L2cr is used in the setting of the current upper limit value Ilim when the reference voltage Vs changes in the increase direction. A voltage width between the decrease line L1cr and the recovery line L2cr is obtained as a result of setting the hysteresis. Consequently, even when the reference voltage Vs starts to increase from its decrease state, the current upper limit value Ilim is maintained at a specific value and is not increased while the reference voltage Vs does not increase to a voltage defined by the recovery line L2cr.

In the two upper limit characteristics, a value when the current upper limit value Ilim is not decreased (referred to as a basic current upper limit value Ilim0) is the same value. Hereinafter, the gradient of the decrease line L1no, i.e., the gradient with which the current upper limit value Ilim is decreased in response to the decrease of the reference voltage Vs is referred to as a decrease gradient α1no, and the gradient of the decrease line L1cr is referred to as a decrease gradient α1cr. Each of the decrease gradients α1no and α1cr corresponds to a decrease rate of the invention. In addition, the gradient of the recovery line L2no, i.e., the gradient with which the current upper limit value Ilim is increased in response to the increase of the reference voltage Vs is referred to as an increase gradient α2no, and the gradient of the recovery line L2cr is referred to as an increase gradient α2cr. Each of the increase gradients α2no and α2cr corresponds to an increase rate of the invention. In addition, the reference voltage Vs when the decrease of the current upper limit value Ilim is started using the decrease line L1no is referred to as a decrease start voltage V1no, and the reference voltage Vs when the decrease of the current upper limit value Ilim is started using the decrease line L1cr is referred to as a decrease start voltage V1cr. Further, the reference voltage Vs when the current upper limit value Ilim is set to zero using the decrease line L1no is referred to as an assist prohibition voltage V2no, and the reference voltage Vs when the current upper limit value Ilim is set to zero using the decrease line L1cr is referred to as an assist prohibition voltage V2cr. Furthermore, the reference voltage Vs when the increase of the current upper limit value Ilim is started using the recovery line L2no is referred to as an increase start voltage V3no, and the reference voltage Vs when the increase of the current upper limit value Ilim is started using the recovery line L2cr is referred to as an increase start voltage V3cr.

As can be seen from FIGS. 4 and 5, in the two upper limit characteristics, the decrease gradient α1cr is set to be smaller than the decrease gradient α1no, and the increase gradient α2cr is set to be larger than the increase gradient α2no. In addition, the decrease start voltage V1cr is set to be lower than the decrease start voltage V1no, and the increase start voltage V3cr is set to be lower than the increase start voltage V3no.

It should be noted that, in FIGS. 4 and 5, each of the increase start voltages V3no and V3cr represents the reference voltage Vs when the current upper limit value Ilim starts to increase from zero, but the increase start voltages V3no and V3cr are not limited thereto. That is, in the case where the reference voltage Vs has increased in a state in which the current upper limit value Ilim is set to an arbitrary value, each of the increase start voltages V3no and V3cr represents the reference voltage Vs when the increase of the current upper limit value Ilim is started in response to the increase of the reference voltage Vs. For example, as shown in FIG. 5, in the case where the reference voltage Vs has increased in a state in which the current upper limit value Ilim is set to Ilim1, the increase of the current upper limit value Ilim is started when the reference voltage Vs has increased from a voltage value indicated by a point P1 to a voltage value indicated by a point P3 in the cranking upper limit characteristic, but the increase of the current upper limit value Ilim is started when the reference voltage Vs has increased from a voltage value indicated by a point P2 to a voltage value indicated by a point P4 in the non-cranking upper limit characteristic. In this case, the voltage value indicated by the point P3 corresponds to the increase start voltage V3cr, and the voltage value indicated by the point P4 corresponds to the increase start voltage V3no (>V3cr). In the present embodiment, after the current upper limit value Ilim is decreased from the basic current upper limit value Ilim0, the increase start voltage V3cr is set to be lower than the increase start voltage V3no irrespective of the value set as the current upper limit value Ilim.

With regard to the magnitude relationship between the increase gradients α2no and α2cr, in the case where each of the recovery lines L2no and L2cr is represented by a function other than a linear function (i.e., in the case where the current upper limit value Ilim is not increased with a constant increase rate relative (in proportion) to the reference voltage Vs), an average increase gradient (e.g., a gradient of a segment connecting a point at which the increase of the current upper limit value Ilim is started in a state in which the current upper limit value Ilim is set to zero and a point at which the current upper limit value Ilim reaches the basic current upper limit value Ilim0 in response to the increase of the reference voltage Vs) may be used. In addition, with regard to the magnitude relationship between the decrease gradients α1no and α1cr, in the case where each of the decrease lines L1no and L1cr is represented by a function other than the linear function (i.e., in the case where the current upper limit value Ilim is not decreased with a constant decrease rate relative (in proportion) to the reference voltage Vs), an average decrease gradient (e.g., a gradient of a segment connecting a point at which the decrease of the current upper limit value Ilim is started from the basic current upper limit value Ilim0 and a point at which the current upper limit value Ilim is set to zero in response to the decrease of the reference voltage Vs) may be used.

Consequently, the following operations and effects are obtained by the settings described above.

1. The recovery line L2cr in the cranking upper limit characteristic is set such that the current upper limit value Ilim corresponding to the reference voltage Vs is higher than that of the recovery line L2no in the non-cranking upper limit characteristic. In this case, in the graph in FIG. 5, the recovery line L2cr is positioned on the left side of the recovery line L2no. Consequently, the increase start voltage V3cr is set to be lower than the increase start voltage V3no, and hence it is possible to start to relax the current limitation at an early timing with the recovery of the reference voltage Vs during cranking and, as a result, it is possible to lift the current limitation early. With this, it is possible to shorten the time period when the operation feeling of the steering wheel is heavy due to the current limitation. Consequently, it is possible to effectively use the steering assist. On the other hand, in the case where the decrease of the power supply voltage occurs during non-cranking, there is a high possibility that the battery 101 is degraded. To cope with this, by setting the current upper limit value Ilim corresponding to the reference voltage Vs in the recovery line L2no to a low value, it is possible to suppress the decrease of the power supply voltage, and reduce the possibility of occurrence of the hunting phenomenon caused by lifting the current limitation.

2. The increase gradient α2cr in the cranking upper limit characteristic is set to a value larger than that of the increase gradient α2no in the non-cranking upper limit characteristic. Consequently, during cranking, it is possible to relax the current limitation at a high speed with the recovery of the reference voltage Vs and, as a result, it is possible to lift the current limitation early. With this, it is possible to shorten the time period when the operation feeling of the steering wheel is heavy due to the current limitation. On the other hand, in the case where the decrease of the power supply voltage occurs during non-cranking, there is a high possibility that the battery 101 is degraded. In the case where the power supply ability of the power supply device 100 is constantly reduced, the operation feeling of the steering wheel becomes heavy due to the current limitation. On the other hand, when the increase gradient with which the current upper limit value Ilim is increased is large, the operation feeling of the steering wheel suddenly becomes light, and the steering wheel may be operated excessively. To cope with this, in the present embodiment, the increase gradient α2no in the non-cranking upper limit characteristic is set to be small. Accordingly, the current limitation is slowly relaxed, and it is possible to prevent the driver from operating the steering wheel excessively. In addition, it is also possible to reduce the possibility of occurrence of the hunting phenomenon caused by lifting the current limitation. It should be noted that the current limitation is relaxed at a high speed during cranking. This leads to an improvement in steering operation feeling because it is possible to return the operation feeling of the steering wheel that has become heavy temporarily to a normal operation feeling early.

3. The decrease line L1cr in the cranking upper limit characteristic is set such that the current upper limit value Ilim corresponding to the reference voltage Vs is higher than that of the decrease line L1no in the non-cranking upper limit characteristic. In this case, in the graph in FIG. 5, the decrease line L1cr is positioned on the left side of the decrease line L1no. Consequently, the decrease start voltage V1cr is set to be lower than the decrease start voltage V1no, and hence it is possible to prevent the decrease operation of the current upper limit value Ilim from being performed unnecessarily during cranking. That is, it is possible to reduce the frequency of limitation of the steering assist by the current limitation. With this, it is possible to effectively use the steering assist. On the other hand, in the case where the decrease of the power supply voltage occurs during non-cranking, there is a high possibility that the battery 101 is degraded. To cope with this, it is possible to reliably limit the current caused to pass through the motor 20 by setting the current upper limit value Ilim corresponding to the reference voltage Vs to a low value. With this, it is possible to suppress the decrease of the power supply voltage excellently.

4. The decrease gradient α1cr in the cranking upper limit characteristic is set to a value smaller than that of the decrease gradient α1no in the non-cranking upper limit characteristic. Consequently, during cranking, it is possible to slowly decrease the current upper limit Ilim in response to the decrease of the power supply voltage. Consequently, it is possible to prevent sudden change of the steering operation feeling. On the other hand, in the case where the decrease of the power supply voltage occurs during non-cranking, there is a high possibility that the battery 101 is degraded and the power supply ability is reduced. To cope with this, it is possible to suppress the decrease of the power supply voltage excellently by decreasing the current upper limit value Ilim in response to the decrease of the reference voltage Vs quickly.

5. The reference voltage Vs is calculated by performing the low-pass filter processing on the detected voltage value. As a result, the detection of the reference voltage Vs is delayed. However, during cranking, by performing the current upper limit limitation by using the cranking upper limit characteristic set in the manner described above, it is possible to recover the delay and lift the current limitation early. With this, it is possible to shorten the time period when the operation feeling of the steering wheel is heavy due to the current limitation.

As described thus far, according to the electric power steering device in the present embodiment, it is possible to appropriately perform the current limitation during cranking and the current limitation during non-cranking. As a result, it is possible to improve the steering operation feeling while suppressing the decrease of the voltage of the power supply device 100.

Although the electric power steering device of the embodiment of the invention has been described thus far, the invention is not limited to the embodiment, and various changes can be made without departing from the object of the invention.

Figure 6:
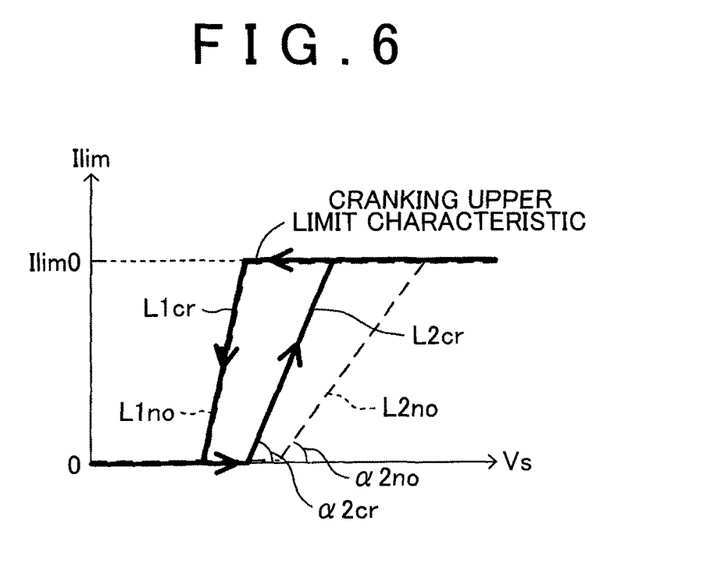
FIG. 6 is a graph showing the cranking upper limit characteristic as a modification.

For example, as shown in FIG. 6, in the cranking upper limit characteristic and the non-cranking upper limit characteristic, the characteristic of the decrease line L1cr may be made equal to that of the decrease line L1no, and only the characteristic of the recovery line L2cr may be made different from that of the recovery line L2no. In this case, the current upper limit value Ilim corresponding to the reference voltage Vs of the recovery line L2cr is preferably set to be higher than that of the recovery line L2no. In addition, the increase gradient α2cr is preferably set to a value larger than that of the increase gradient α2no. Consequently, in this modification as well, it is possible to lift the current limitation early during cranking. With this, it is possible to shorten the time period when the steering assist is limited by the current limitation. In addition, the upper limit characteristic when the current limitation is started is set to be equal to the upper limit characteristic during non-cranking, and hence it is possible to impose the strict current limitation, and prevent excessive drop of the power supply voltage.

Figure 7:
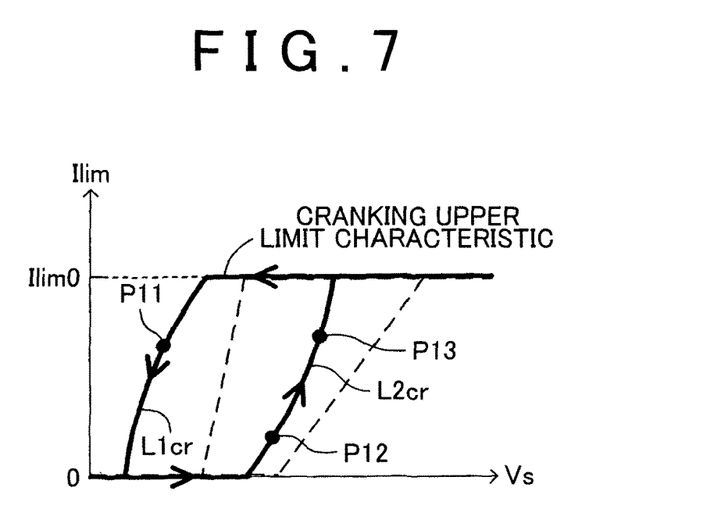
FIG. 7 is a graph showing the cranking upper limit characteristic as another modification.

In addition, in the present embodiment, the characteristic of each of the decrease lines L1no and L1cr and the recovery lines L2no and L2cr is set to the characteristic represented by the linear function, but it is not always necessary to do so and, for example, as shown in FIG. 7, a nonlinear characteristic may also be set. In addition, as shown in FIG. 7, a specific waiting time period may be set at each of arbitrary points P11, P12, and P13, and the current upper limit value Ilim may be maintained for the waiting time period.

Further, the current limitation may be performed (the upper limit limitation is imposed on the current caused to pass through the motor 20) such that the change rate of the reference voltage Vs is reflected in the limitation. For example, the characteristic selection/current upper limit value calculation section 64 may calculate a reference voltage differential value Vs' obtained by differentiating the reference voltage Vs with respect to time, and may correct the current upper limit value Ilim calculated from each of the upper limit characteristic maps MP1 and MP2 when the reference voltage Vs decreases such that the current upper limit value Ilim is decreased in the case where a voltage decrease speed represented by the reference voltage differential value Vs' is higher than a set decrease speed (in the case where the reference voltage differential value Vs' is a negative value and its absolute value is larger than the set decrease speed). In addition, the current upper limit value Ilim when the reference voltage Vs decreases may be corrected so as to be smaller as the voltage decrease speed is higher. In the case where the voltage increase speed represented by the reference voltage differential value Vs' is higher than the set increase speed (in the case where the reference voltage differential value Vs' is a positive value and its absolute value is larger than the set increase speed), the current upperlimit value Ilim determined when the reference voltage Vs increases may be corrected so as to be increased within a range in which the current upper limit value Ilim does not exceed the basic current upper limit value Ilim0. In addition, the current upper limit value Ilim determined when the reference voltage Vs increases may be corrected so as to become larger within the range in which the current upper limit value Ilim does not exceed the basic current upper limit value Ilim0 as the voltage increase speed is higher.

Furthermore, in the present embodiment, as a method for detecting the cranking state, the determination is made based on whether or not the engine start switch 110 is turned OFF during the steering assist control, but, instead of the above method, the determination may be made based on whether or not the engine start switch 110 is turned ON during the steering assist control. For example, as shown at time t6 in FIG. 3, at the timing when a state in which the IG voltage Vig is not more than the predetermined voltage Vigref is switched to a state in which the IG voltage Vig exceeds the predetermined voltage Vigref during the steering assist control, it may be determined that the cranking state is established. According to this modification, it is possible to shorten a time period required until the actual cranking operation is performed after the detection of the cranking state, and perform more appropriate current limitation.

In addition, as another method for detecting the cranking state, it may be determined that the cranking state is established by inputting information indicative of start of the cranking operation from the engine ECU 90 during the steering assist control. Further, in the case where the engine ECU 90 includes an idling stop control function, it may also be determined that the cranking state is established by inputting idling stop information (information indicative of a standby state for the start of the engine). According to this modification, it is possible to detect the cranking state with higher accuracy and perform more appropriate current limitation.

Furthermore, in the present embodiment, the cranking upper limit characteristic is made different from the non-cranking upper limit characteristic in a plurality of items (the decrease gradient, the increase gradient, the decrease start voltage, and the increase start voltage) for determining the characteristics of the decrease lines L1cr and L1no and the recovery lines L2cr and L2no such that the current limitation is relaxed in the cranking upper limit characteristic as compared with the non-cranking upper limit characteristic. However, in the invention, it is not always necessary to make the cranking upper limit characteristic different from the non-cranking upper limit characteristic in all of the items, and the cranking upper limit characteristic may be appropriately set such that the current limitation is relaxed as compared with the non-cranking upper limit characteristic by using one of the items or a plurality of the items that are combined arbitrarily.

What is claimed is:

1. An electric power steering device receiving power supply from a vehicle-mounted power supply comprising:
   steering torque detection means for detecting a steering torque input by a driver;
   a motor that generates a steering assist torque;
   motor control means for controlling energization of the motor in accordance with the steering torque detected by the steering torque detection means;
   power supply voltage detection means for detecting a power supply voltage as an output voltage of the vehicle-mounted power supply;
   current upper limit value setting means for decreasing a current upper limit value in response to a decrease of the power supply voltage and increasing the current upper limit value in response to an increase of the power supply voltage in a case where the power supply voltage starts to increase after the current upper limit value is decreased, the current upper limit value setting means includes:
   cranking state detection means for detecting a cranking state in which it is supposed that an engine is in a situation where the engine is cranked; and
   upper limit characteristic selection means for selecting a non-cranking upper limit characteristic, as the current upper limit value, in which the current upper limit value is set based on the power supply voltage when the cranking state is not detected, and selecting a cranking upper limit characteristic, as the current upper limit value, in which the current upper limit value is set based on the power supply voltage such that the upper limit limitation on the current caused to pass through the motor is relaxed as compared with the non-cranking upper limit characteristic when the cranking state is detected, and
   current limitation means for imposing the upper limit limitation on the current caused to pass through the motor such that the current caused to pass through the motor is not more than the current upper limit value selected by the upper limit characteristic selection means, wherein
   the cranking upper limit characteristic is set such that the current upper limit value corresponding to the power supply voltage during a time period when the current upper limit value is increased is maintained at a value higher than the value in the non-cranking upper limit characteristic, and the upper limit limitation on the current is thereby relaxed.

2. The electric power steering device according to claim 1, wherein
   the cranking upper limit characteristic is set such that an increase start voltage representing the power supply voltage when the increase of the current upper limit value is started after the power supply voltage starts to increase is lower than the increase start voltage in the non-cranking upper limit characteristic, and the upper limit limitation on the current is thereby relaxed.

3. The electric power steering device according to claim 1, wherein
   the cranking upper limit characteristic is set such that an increase rate at which the current upper limit value is increased in response to the increase of the power supply voltage after the power supply voltage starts to increase is larger than the increase rate in the non-cranking upper limit characteristic, and the upper limit limitation on the current is thereby relaxed.

4. The electric power steering device according to claim 1, wherein
   the cranking upper limit characteristic is set such that the current upper limit value corresponding to the power supply voltage during a time period when the current upper limit value is decreased is maintained at a value higher than the value in the non-cranking upper limit characteristic, and the upper limit limitation on the current is thereby relaxed.

5. The electric power steering device according to claim 4, wherein
the cranking upper limit characteristic is set such that a decrease start voltage representing the power supply voltage when the decrease of the current upper limit value is started in response to the decrease of the power supply voltage is lower than the decrease start voltage in the non-cranking upper limit characteristic, and the upper limit limitation on the current is thereby relaxed.

6. The electric power steering device according to claim 4, wherein
the cranking upper limit characteristic is set such that a decrease rate at which the current upper limit value is decreased in response to the decrease of the power supply voltage is smaller than the decrease rate in the non-cranking upper limit characteristic, and the upper limit limitation on the current is thereby relaxed.

7. The electric power steering device according to claim 1, wherein
the same current upper limit value corresponding to the power supply voltage in a case where the current upper limit value is decreased in response to the decrease of the power supply voltage is set in each of the cranking upper limit characteristic and the non-cranking upper limit characteristic.

8. An electric power steering system comprising:
a steering torque detection unit that detects a steering torque applied to a steering wheel;
a motor that generates a steering assist torque; and
an electric control unit that controls energization of the motor in accordance with the steering torque detected by the steering torque detection unit, detects a power supply voltage as an output voltage of a vehicle-mounted power supply, decreases a current upper limit value in response to a decrease of the power supply voltage, increases the current upper limit value in response to an increase of the power supply voltage in a case where the power supply voltage starts to increase after the current upper limit value is decreased, detects a cranking state in which it is supposed that an engine is in a situation where the engine is cranked, selects a non-cranking upper limit characteristic, as the current upper limit value, in which the current upper limit value is set based on the power supply voltage when the cranking state is not detected, selects a cranking upper limit characteristic, as the current upper limit value in which the current upper limit value is set based on the power supply voltage such that the upper limit limitation on the current caused to pass through the motor is relaxed as compared with the non-cranking upper limit characteristic when the cranking state is detected, and imposes the upper limit limitation on the current caused to pass through the motor such that the current caused to pass through the motor is not more than the current upper limit value, wherein
the cranking upper limit characteristic is set such that the current upper limit value corresponding to the power supply voltage during a time period when the current upper limit value is increased is maintained at a value higher than the value in the non-cranking upper limit characteristic, and the upper limit limitation on the current is thereby relaxed.

* * * * *